United States Patent
Koyama et al.

(10) Patent No.: US 9,708,063 B2
(45) Date of Patent: Jul. 18, 2017

(54) AIRCRAFT LAVATORY UNIT

(71) Applicant: The Yokohama Rubber Co., LTD., Minato-ku, Tokyo (JP)

(72) Inventors: Takashi Koyama, Hiratsuka (JP); Masayuki Fushimi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 151 days.

(21) Appl. No.: 14/434,403

(22) PCT Filed: Oct. 9, 2013

(86) PCT No.: PCT/JP2013/006019
§ 371 (c)(1),
(2) Date: Apr. 8, 2015

(87) PCT Pub. No.: WO2014/057667
PCT Pub. Date: Apr. 17, 2014

(65) Prior Publication Data
US 2015/0266582 A1 Sep. 24, 2015

(30) Foreign Application Priority Data
Oct. 10, 2012 (JP) .................................. 2012-224870

(51) Int. Cl.
*B64D 11/00* (2006.01)
*B64D 11/02* (2006.01)
*B64D 25/00* (2006.01)

(52) U.S. Cl.
CPC .............. *B64D 11/02* (2013.01); *B64D 25/00* (2013.01); *Y02T 50/46* (2013.01)

(58) Field of Classification Search
None
See application file for complete search history.

(56) References Cited

U.S. PATENT DOCUMENTS 1,767,361 A * 6/1930 Hautot ...................... B61D 1/08
105/315
2,650,368 A * 9/1953 Evans .................... B64D 11/02
312/304

(Continued)

FOREIGN PATENT DOCUMENTS

| DE | 20 2005 015 729 | 1/2006 |
| JP | H01-150198 | 10/1989 |

(Continued)

OTHER PUBLICATIONS

International Search Report for International Application No. PCT/JP2013/006019 dated Jan. 14, 2014, 4 pages, Japan.

*Primary Examiner* — Medhat Badawi
(74) *Attorney, Agent, or Firm* — Thorpe North & Western (57) ABSTRACT

An aircraft lavatory unit includes a toilet disposed in a lavatory in front of a rear wall. A wash basin is provided at a location on a second side wall between the toilet and front wall, and has a bowl. A bottom compartment, including a contour matching the contour of a section of a bowl on the rear wall side, is provided between a bottom wall and the bowl, and a trash receptacle, consisting of a trash can and a fire extinguisher, is provided in the bottom compartment. The toilet is disposed inclined at an angle relative to the second side wall, so that the center line passing through the center of the toilet in the widthwise direction is farther from the second side wall, as it gets closer to the front wall side relative to the second side wall.

20 Claims, 9 Drawing Sheets

(56) References Cited

U.S. PATENT DOCUMENTS

| | | | | |
|---|---|---|---|---|
| 4,645,145 A * | 2/1987 | Alie | B64D 11/02 | 105/314 |
| 4,884,767 A * | 12/1989 | Shibata | B64D 11/02 | 105/315 |
| 5,065,462 A * | 11/1991 | Romano | A47K 4/00 | 4/604 |
| 5,093,941 A * | 3/1992 | Muller | A47K 4/00 | 4/449 |
| 5,150,863 A * | 9/1992 | Hozumi | B64D 11/00 | 244/118.5 |
| 5,560,050 A * | 10/1996 | Tagg | E04H 1/1216 | 4/449 |
| 5,566,404 A * | 10/1996 | Laughton | E03C 1/18 | 4/619 |
| 6,007,025 A * | 12/1999 | Coughren | B64D 11/02 | 105/329.1 |
| 6,079,669 A * | 6/2000 | Hanay | B64D 11/0691 | 244/118.5 |
| 6,182,926 B1 * | 2/2001 | Moore | B64D 11/00 | 244/118.5 |
| 6,185,759 B1 * | 2/2001 | Staudenmayer | A47K 4/00 | 4/254 |
| 6,460,204 B1 * | 10/2002 | Krist | E03C 1/01 | 4/252.3 |
| 6,604,709 B1 * | 8/2003 | Wentland | B64D 11/02 | 244/117 R |
| D486,565 S * | 2/2004 | Itakura | D23/274 | |
| D487,137 S * | 2/2004 | Itakura | D23/274 | |
| 6,889,936 B1 * | 5/2005 | Pho | B64D 11/02 | 105/315 |
| 7,100,872 B2 * | 9/2006 | Quan | B64D 11/02 | 244/118.5 |
| 7,222,820 B2 * | 5/2007 | Wentland | B64D 11/02 | 244/118.5 |
| 7,275,716 B2 * | 10/2007 | Saint-Jalmes | B64D 11/00 | 244/118.6 |
| 7,299,511 B2 * | 11/2007 | Quan | E03C 1/01 | 4/664 |
| 7,354,018 B2 * | 4/2008 | Saint-Jalmes | B64D 11/00 | 105/315 |
| 7,762,496 B2 * | 7/2010 | Seiersen | B64D 11/00 | 105/316 |
| 7,823,831 B2 * | 11/2010 | Guering | B64D 11/0601 | 105/316 |
| 8,519,824 B1 * | 8/2013 | Rankin | B64D 11/00 | 244/118.5 |
| 8,944,377 B2 * | 2/2015 | McIntosh | E03D 11/00 | 244/118.2 |
| 9,045,231 B2 * | 6/2015 | Swain | B64D 11/0023 | |
| 9,308,997 B2 * | 4/2016 | Scown | B64D 11/02 | |
| 2003/0140571 A1 * | 7/2003 | Muha | A47K 4/00 | 52/79.1 |
| 2004/0123381 A1 * | 7/2004 | Kitade | B64D 11/02 | 4/665 |
| 2004/0163170 A1 * | 8/2004 | Cooper | B64D 11/02 | 4/664 |
| 2005/0103935 A1 * | 5/2005 | Sprenger | B64D 11/00 | 244/118.6 |
| 2005/0241062 A1 * | 11/2005 | Quan | E03C 1/01 | 4/664 |
| 2005/0242641 A1 | 11/2005 | Thompson | | |
| 2007/0295863 A1 | 12/2007 | Thompson | | |
| 2008/0179456 A1 * | 7/2008 | Diergardt | B64D 11/0015 | 244/118.1 |
| 2008/0265092 A1 * | 10/2008 | Cooper | B64D 11/02 | 244/118.5 |
| 2009/0283636 A1 | 11/2009 | Saint-Jalmes et al. | | |
| 2012/0221192 A1 * | 8/2012 | Seibt | B64D 11/02 | 701/29.1 |
| 2013/0099055 A1 * | 4/2013 | Pfeiffer | B64D 11/02 | 244/118.5 |
| 2013/0206904 A1 * | 8/2013 | Gee | B64D 11/02 | 244/118.5 |
| 2013/0206905 A1 * | 8/2013 | Savian | B64D 11/003 | 244/118.5 |
| 2014/0097294 A1 * | 4/2014 | Boren | B64D 11/02 | 244/118.5 |
| 2014/0117156 A1 * | 5/2014 | Boren | B64D 11/02 | 244/118.6 |
| 2014/0353425 A1 * | 12/2014 | Boren, Jr. | B64D 11/04 | 244/118.5 |
| 2016/0009396 A1 * | 1/2016 | Seibt | B64D 11/02 | 244/118.5 |

FOREIGN PATENT DOCUMENTS

| | | |
|---|---|---|
| JP | H06-020781 | 3/1994 |
| JP | H06-197997 | 7/1994 |
| JP | 2004-203167 | 7/2004 |
| JP | 2007-029544 | 2/2007 |
| JP | 2009-137511 | 6/2009 |
| WO | WO 03/053735 | 7/2003 |
| WO | WO 2004/076281 | 9/2004 |

* cited by examiner

AIRCRAFT LAVATORY UNIT

TECHNICAL FIELD

The present technology relates to an aircraft lavatory unit.

BACKGROUND

Aircraft have multiple seats, lavatories, and galleys disposed in a space limited by the fuselage.

Various proposals have been made for the sake of increasing the number of seats.

For example, US Patent Publication Nos. 2008/0179456A1 and 2009/0283636A1 disclose movable aircraft lavatory units, and propose aircraft lavatory units having layouts able to be altered.

Nevertheless, even if the layout of aircraft lavatory units is altered, the area they occupy remains unchanged, and thus there are limitations to any expansion in the number of seats.

In many cases, the lavatories inside of aircraft lavatory units, in addition to toilets, are provided with wash basins having bowls and compartments for lavatory toiletries, but these bowls and compartments protrude on the sides of the lavatories from the wall parts partitioning them.

Thus, depending on the mutual positional relationship of the toilet, bowl and compartment, the bowl and compartment may become an obstruction and make it difficult to sit upon the toilet seat.

However, if the bowl and compartment are simply disposed farther away from the toilet, the width and depth of the aircraft lavatory unit are enlarged, which is disadvantageous to increasing the number of seats.

SUMMARY

The present technology has been devised in view of the circumstances described above, and provides an aircraft lavatory unit that is advantageous in shortening the width and depth of the lavatory, and thus advantageous in increasing the number of seats.

The present technology provides an aircraft lavatory unit having a lavatory partitioned via a pair of mutually opposing side walls standing up from a bottom wall, a mutually opposing rear wall and front wall standing up from the bottom wall and a ceiling wall opposing the bottom wall, and a toilet disposed in the lavatory in front of the rear wall so that it is possible to sit facing the front wall side, and a wash basin having a bowl for hand-washing provided in the lavatory. The bowl is disposed at a location on one of the pair of side walls between the toilet and the front wall, a bottom compartment including a contour matching the contour of a section of the bowl on the rear wall side when seen in plan view is provided between the bottom wall and the bowl, and the toilet is disposed inclined relative to the side wall where the wash basin is provided, so that the center line passing through the center of the toilet in the widthwise direction is farther from the side wall as it gets closer to the front wall side relative to the side wall.

In the present technology, a bottom compartment is provided below the bowl for effective use of the space within the lavatory.

On one hand, if a bottom compartment is provided below the bowl, the bottom compartment will be greater than the height of the knees of a person seated on a toilet seat, so if the bottom compartment and toilet are close to each other in the widthwise or depth direction of the aircraft lavatory unit, the knees of a person seated on the toilet seat will touch the bottom compartment.

In the present technology, touching of the bottom compartment by the knees of a person seated on the toilet seat is avoided by disposing the toilet inclined relative to the side wall where the wash basin is provided, so that the center line passing through the center of the toilet in the widthwise direction is farther from the side wall as it gets closer to the front wall side relative to the side wall.

Consequently, it is possible to dispose the bottom compartment and toilet close together in the widthwise and depth direction, and shorten both the width and depth of an aircraft lavatory unit.

Consequently, it is possible to shorten the width and depth of an aircraft lavatory unit without losing the usability of the aircraft lavatory unit, and thus the space occupied by an aircraft lavatory unit within an aircraft can be reduced, which is advantageous in increasing the number of seats in an aircraft.

DETAILED DESCRIPTION

First Embodiment

Next, we will explain an aircraft lavatory unit related to an embodiment of the present technology with reference to drawings.

Figure 1:
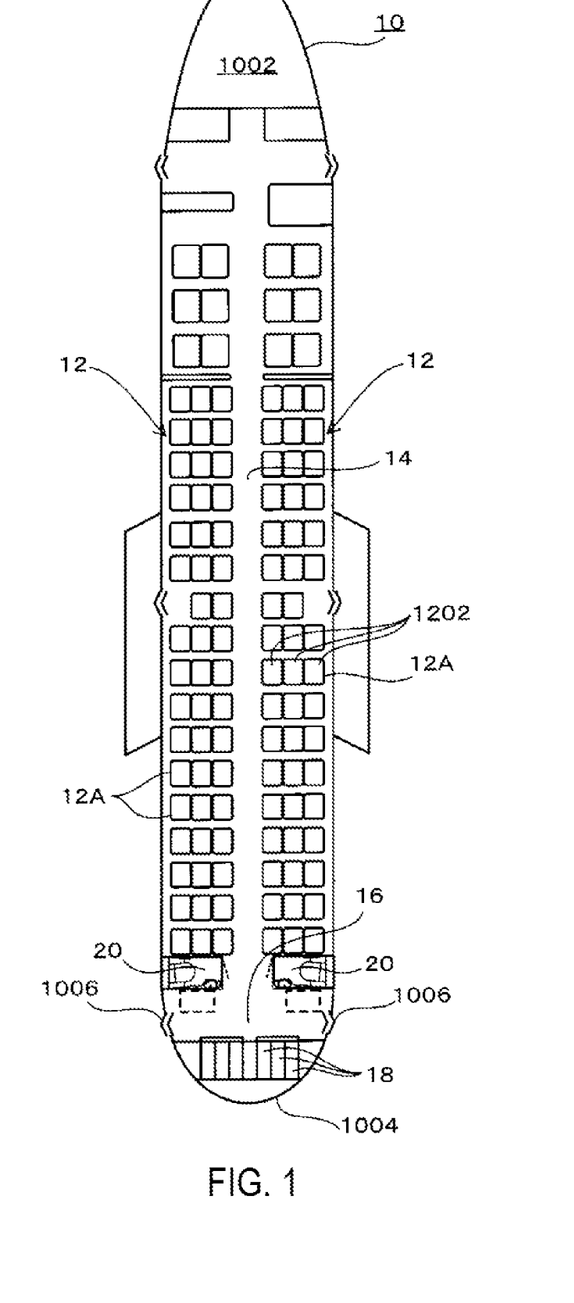
FIG. 1 is a schematic view depicting the layout of an aircraft interior.

As depicted in FIG. 1, seat groups 12 are provided in the fuselage 10 of an aircraft, and additionally a longitudinal aisle 14 and a latitudinal aisle 16 are provided.

The front part of the fuselage 10 serves as a cockpit 1002, and the rear part serves as a pressure bulkhead 1004.

The longitudinal aisle 14 extends along the center of the fuselage 10 in the longitudinal direction of the fuselage 10.

The seat groups 12 are respectively provided on both the left and right sides of the longitudinal aisle 14, and each seat group 12 is constituted by a plurality of seats 1202 arranged in the latitudinal direction of the fuselage 10, and facing the front of the fuselage 10. In the present embodiment, the seat rows 12A are each constituted by three seats 1202 arranged in a row along the widthwise direction.

The latitudinal aisle 16 extends from the aircraft doors 1006 at the rear part of the fuselage 10 in the widthwise direction of the fuselage 10 and to the rear of the seat groups 12, and connects to the longitudinal aisle 14.

Galleys 18 are provided arranged along the front of the pressure bulkhead 1004 in the widthwise direction of the fuselage 10 and to the rear of the latitudinal aisle 16.

Aircraft lavatory units 20 are disposed on either side of the longitudinal aisle 14 to the rear of the seat row 12A positioned at the rear end of the seat groups 12, and along the front of the latitudinal aisle 16.

Next, an aircraft lavatory unit 20 will be described with reference to FIGS. 2 to 8.

Figure 2:
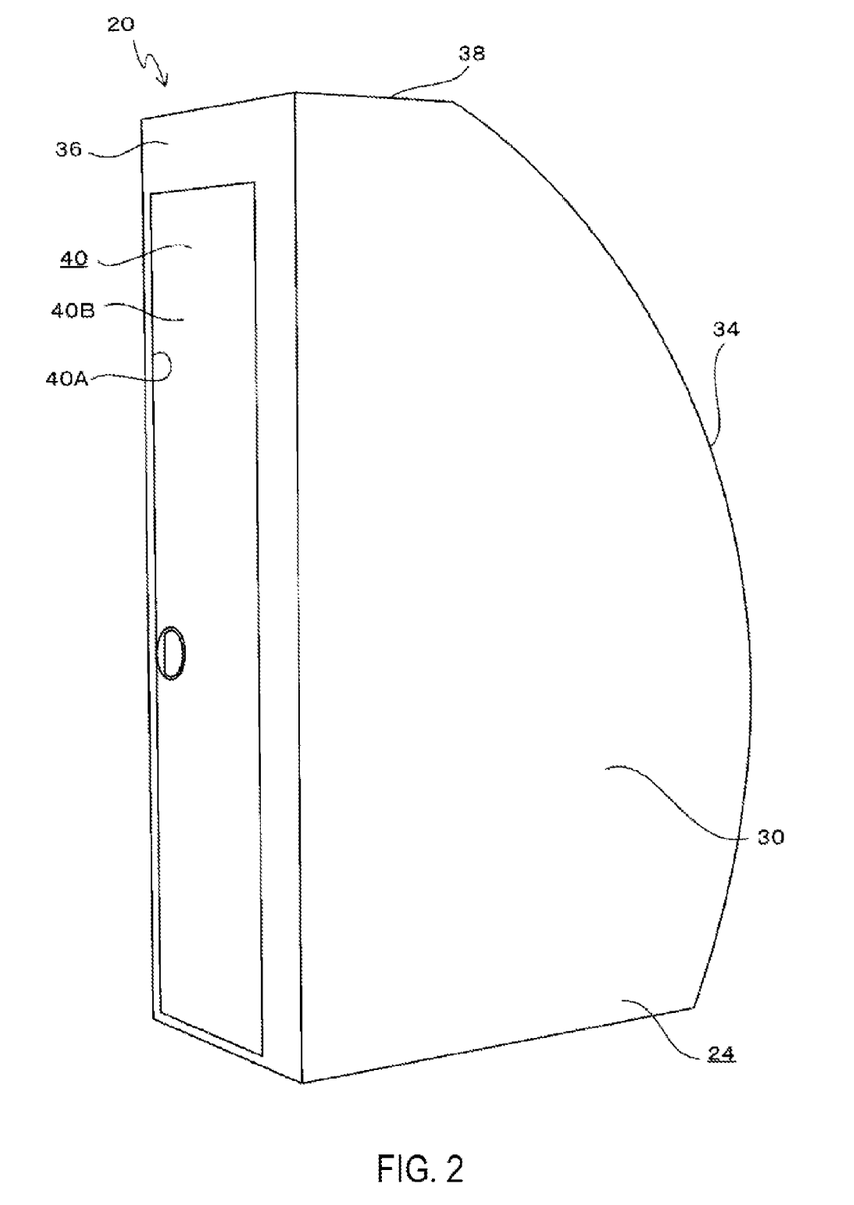
FIG. 2 is a perspective view of an aircraft lavatory unit according to an embodiment.

The body frame 24 of the aircraft lavatory unit 20 has a bottom wall 26, a mutually opposing first side wall 28 and second side wall 30 standing up in parallel from the bottom wall 26, a rear wall 34 connected to first ends of each of the side walls 28, 30, a front wall 36 connected to second ends of the side walls 28, 30 and a ceiling wall 38, and a lavatory 20A provided in the interior thereof.

Furthermore, the rear wall 34, ceiling wall 38, first side wall 28 and second side wall 30 are properly modified matching the shape of the location where the aircraft lavatory unit 20 is installed in the fuselage 10. For example, if aircraft lavatory units 20 are disposed to the sides of the longitudinal aisle 14, then they are modified to match the shape of the fuselage 10, and if they are disposed along the front of the pressure bulkhead 1004, they are modified to match the shape of the pressure bulkhead 1004.

A doorway 40 is provided on the front wall 36 so that it is possible to enter and exit the lavatory 20A. The doorway 40 is constituted by an opening 40A formed on the front wall 36, and a door 40B that opens and closes the opening 40A.

Figure 5:
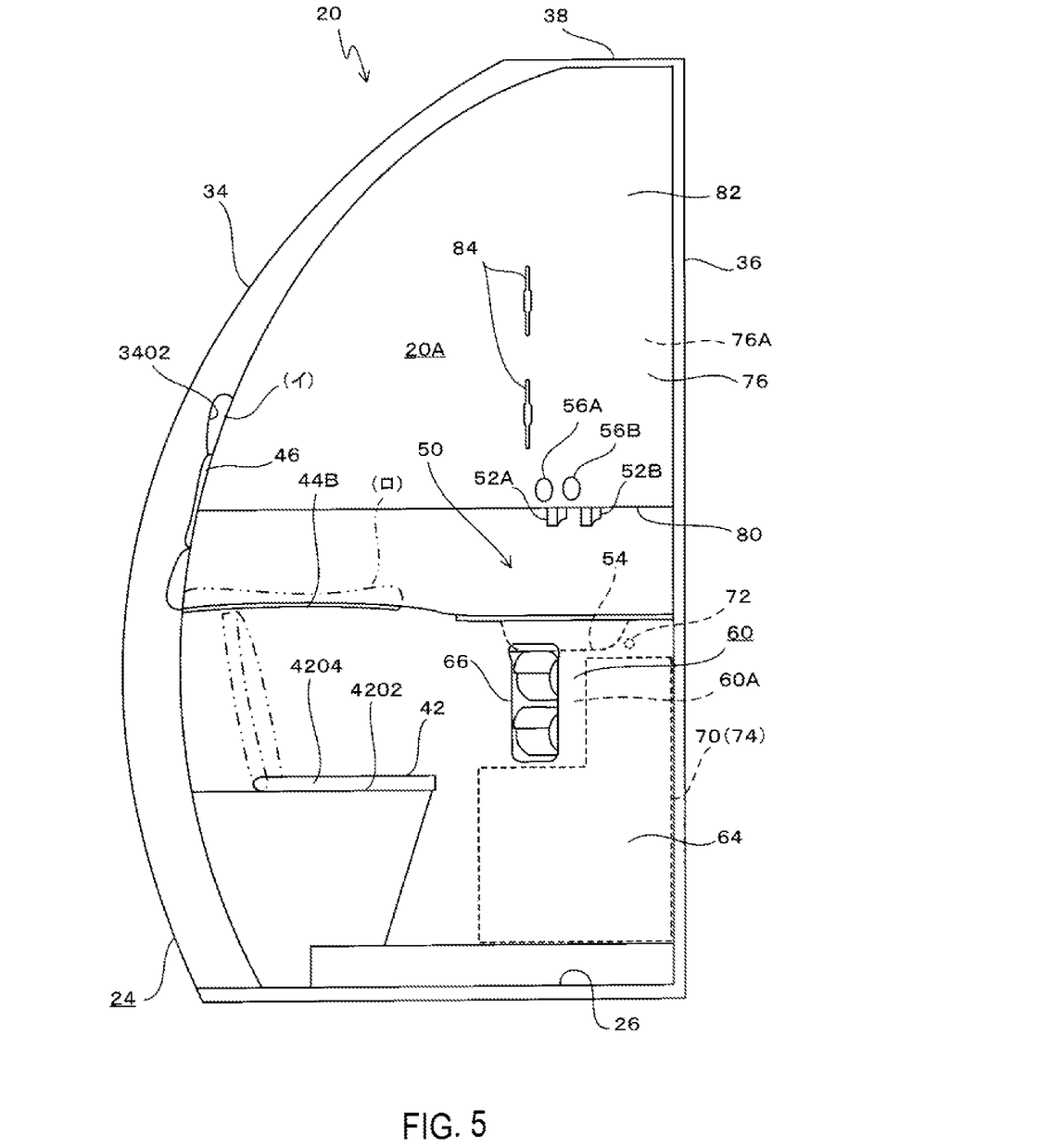
FIG. 5 is a cross-sectional view along line A-A in FIG. 3.

A toilet 42 is disposed in the lavatory 20A in front of the rear wall 34, so that it is possible to sit facing the front wall 36 side. As depicted in FIG. 5, the toilet 42 comprises a toilet seat 4202 and a lid 4204 that covers the toilet seat 4202 in a reclining position and leaves the toilet seat 4202 open in an upright position.

In addition, handrails 44A, 44B used when sitting down upon the toilet seat 4202 or standing up from the toilet seat 4202 are respectively provided at opposing positions on the first side wall 28 and second side wall 30 interposed by the toilet 42.

The handrails 44A, 44B assume a long and narrow shape extending substantially parallel to the floor, and are integrally formed with the first side wall 28 and second side wall 30.

In addition, a diaper changing table 46 is provided at a location on the rear wall 34 above the toilet 42.

The diaper changing table 46 is constituted having an approximately rectangular board shape; for example, a honeycomb sandwich panel or a cushion affixed to a lightweight rigid frame consisting of plastic or other material. The location where the cushion is affixed is the top surface where an infant is laid down when changing a diaper. Furthermore, various conventionally-known structures may be adopted for the configuration of the diaper changing table 46.

One side part of the diaper changing table 46 is attached to a location on the rear wall 34 positioned above the toilet 42 via hinges not depicted in drawings. Thus, by using the hinges as a fulcrum, the diaper changing table 46 is provided such that it can swing between a stored state stored in a storage recess 3402 on the rear wall 34 as depicted by the solid line (a) in FIG. 5, and a usage state folded down above the toilet 42 with the top surface facing upward as depicted by the imaginary line (b) in FIG. 5.

In the present embodiment, the bottom surface of the diaper changing table 46 is constituted to be continuous with the wall surface of the rear wall 34 while the diaper changing table 46 is in a stored state.

Figure 7:
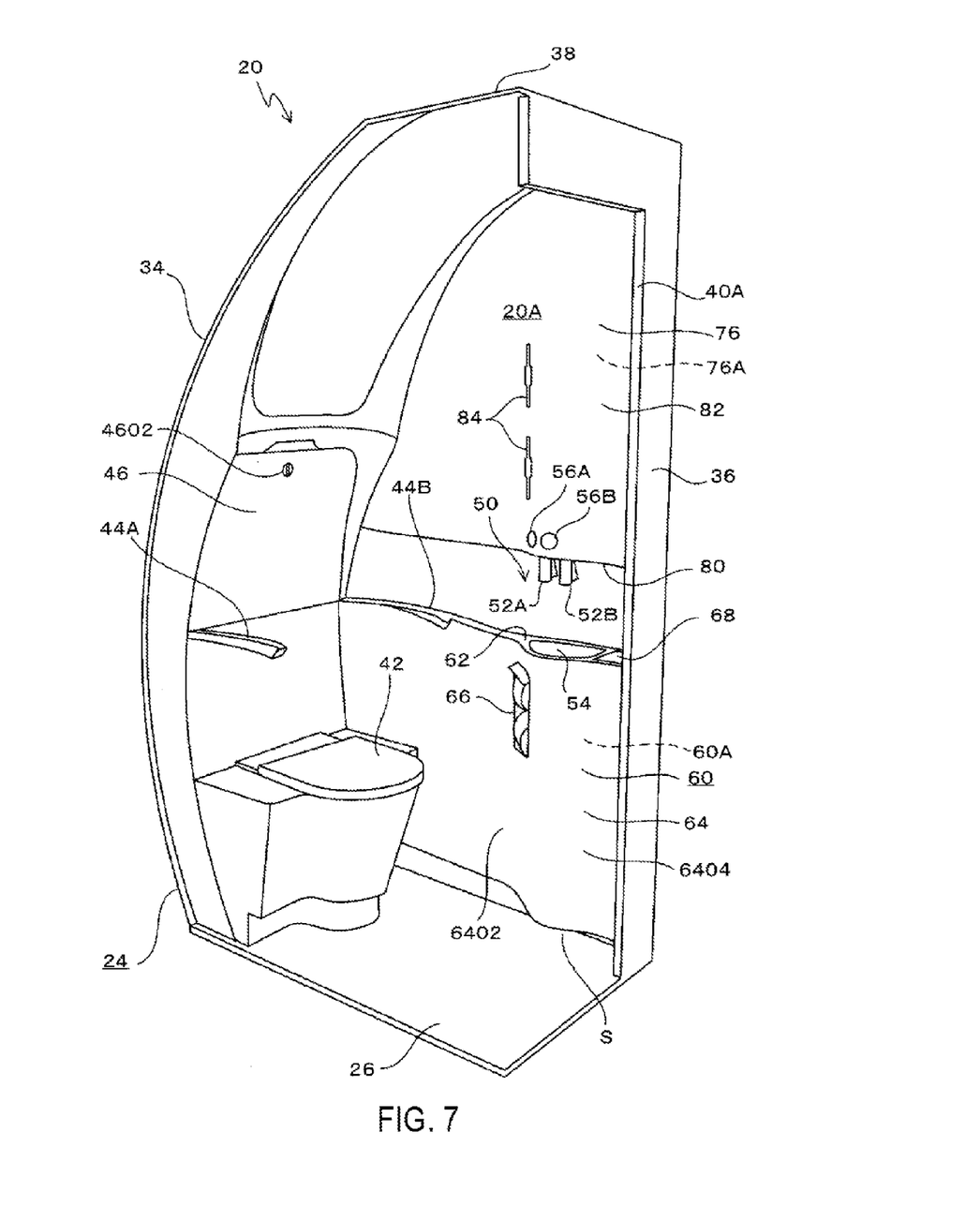
FIG. 7 is a perspective view of the interior of a lavatory viewed diagonally from the forward left.

In addition, as depicted in FIG. 7, a knob 4602 for an engaging and disengaging operation is provided at a location on the bottom surface of the diaper changing table 46 on the opposite side of the hinges. In addition, a fastener (not depicted in drawings) is provided for engaging an engaging part provided on the rear wall 34 when the knob 4602 is operated while the diaper changing table 46 is in a stored state. By engaging the fastener with the engaging part through operation of the knob 4602, the diaper changing table 46 is maintained in a stored state, and when the engagement of the fastener and engaging part is released, it is possible to swing the diaper changing table 46 from a stored state to a usage state.

The diaper changing table 46 is constituted so that the bottom surfaces of two side parts, a side part positioned on the first side wall 28 side and a side part positioned on the second side wall 30 side, are supported by being placed upon the tops of the respective handrails 44A, 44B of the first side wall 28 and second side wall 30 while in a usage state, and thus the diaper changing table 46 is maintained in a usage state.

In the present embodiment, the total length of the top surfaces of the handrails 44A, 44B in the longitudinal direction is constituted to be in contact with the bottom surfaces B of the side parts of the diaper changing table 46 so the diaper changing table 46 can be more stably maintained in a usage state.

Thus, since both side parts of the diaper changing table 46 are supported by the respective handrails 44A, 44B while in a usage state, the structure of the hinge section of the diaper changing table 46 does not need to be secured, which is advantageous in the miniaturization and weight reduction of the aircraft lavatory unit 20.

In addition, since the orientation of the diaper changing table 46 while in a usage state is maintained by utilizing the handrails 44A, 44B used when sitting down on or standing up from the toilet seat 4202, there are no dedicated members for supporting the diaper changing table 46 protruding into the lavatory 20A when the diaper changing table 46 is not in use, which is advantageous in improving the usability of the lavatory 20A.

In addition, a wash basin 50 is provided at a location on the second side wall 30 between the toilet 42 and front wall 36.

Figure 8:
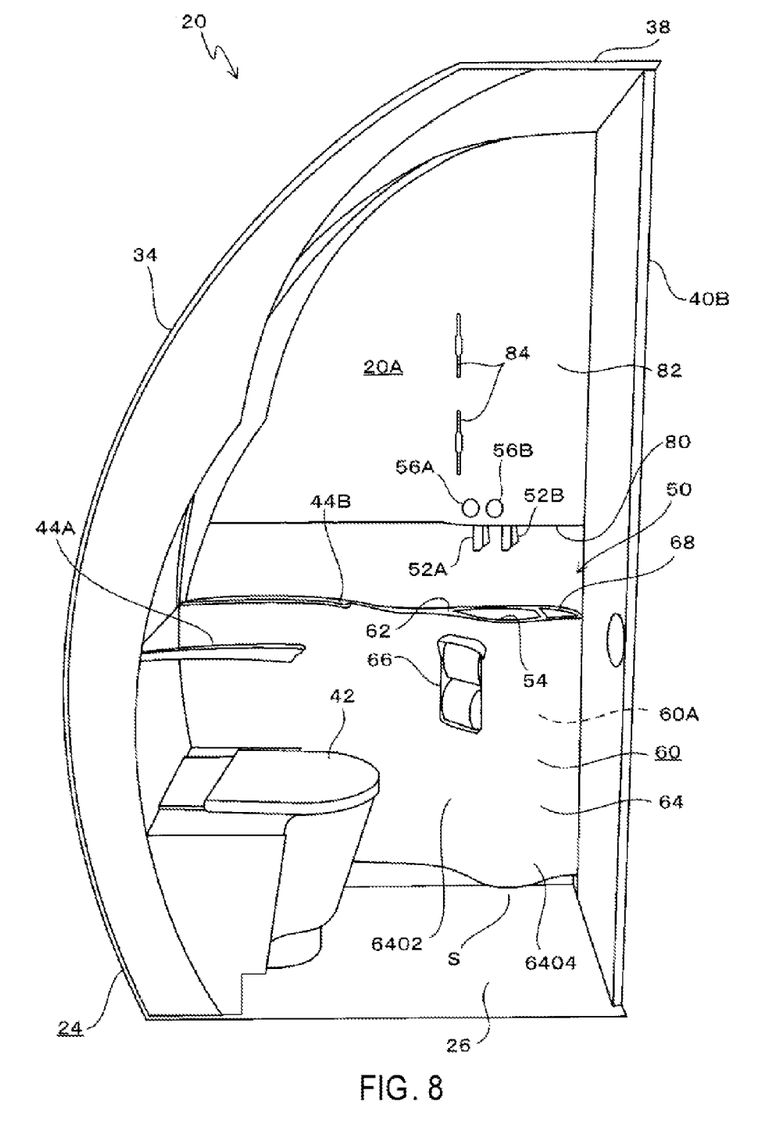
FIG. 8 is a perspective view of the interior of a lavatory viewed from the sideways left.

The wash basin 50, as depicted in FIGS. 5, 7 and 8, has a faucet 52A, liquid soap dispenser 52B and bowl 54. By operating a faucet switch 56A on top of the faucet 52A, water is discharged from the faucet 52A, and by operating a liquid soap dispenser switch 56B on top of the liquid soap dispenser 52B, liquid soap is discharged from the liquid soap dispenser 52B.

The bowl 54 is provided close to waist height to allow users to hand-wash while standing.

A bottom compartment 60, including a contour 58 substantially matching the contour of a section of the bowl 54 on the rear wall 34 side 56 when seen in plan view, is provided between the bottom wall 26 and the bowl 54.

The bottom compartment 60 is constituted by a top plate 62 positioned on the periphery of the opening part of the bowl 54 and connected to the second side wall 30 and front wall 36, and a bottom decorative panel 64 erected from the bottom wall 26 and partitioning the bottom storage space 60A above the bottom wall 26 and below the bowl 54 and top plate 62.

The bottom decorative panel 64, as depicted in FIGS. 7 and 8, has a surface 6402 facing the toilet 42 side, and a surface 6404 facing a location on the front wall 36 towards the first side wall 28.

Specifically, the bowl 54 has a length in the direction joining the front wall 36 and the rear wall 34.

Figure 3:
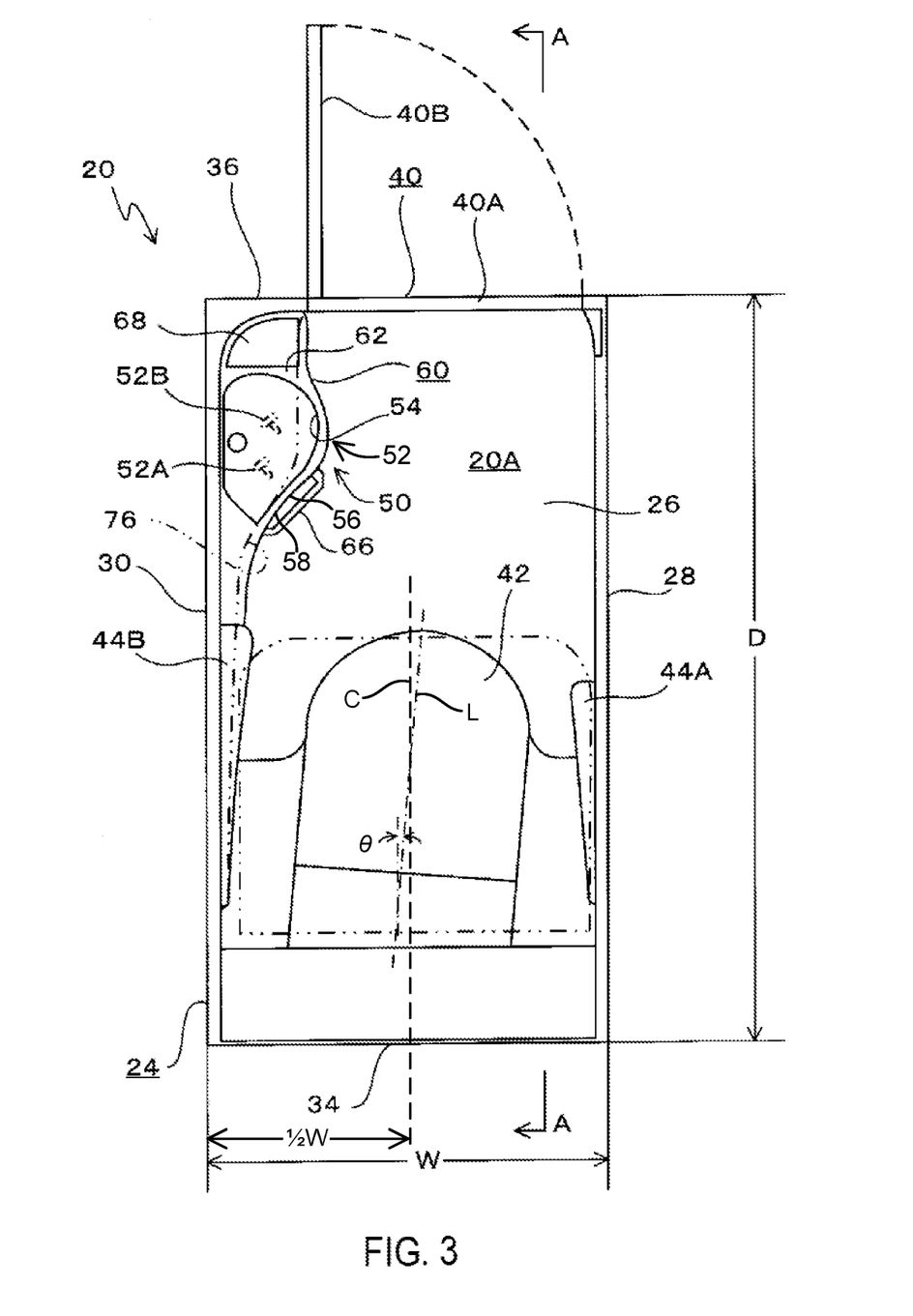
FIG. 3 is a cross-sectional plan view of an aircraft lavatory unit cut horizontally at a location above a bowl of a wash basin.
Figure 4:
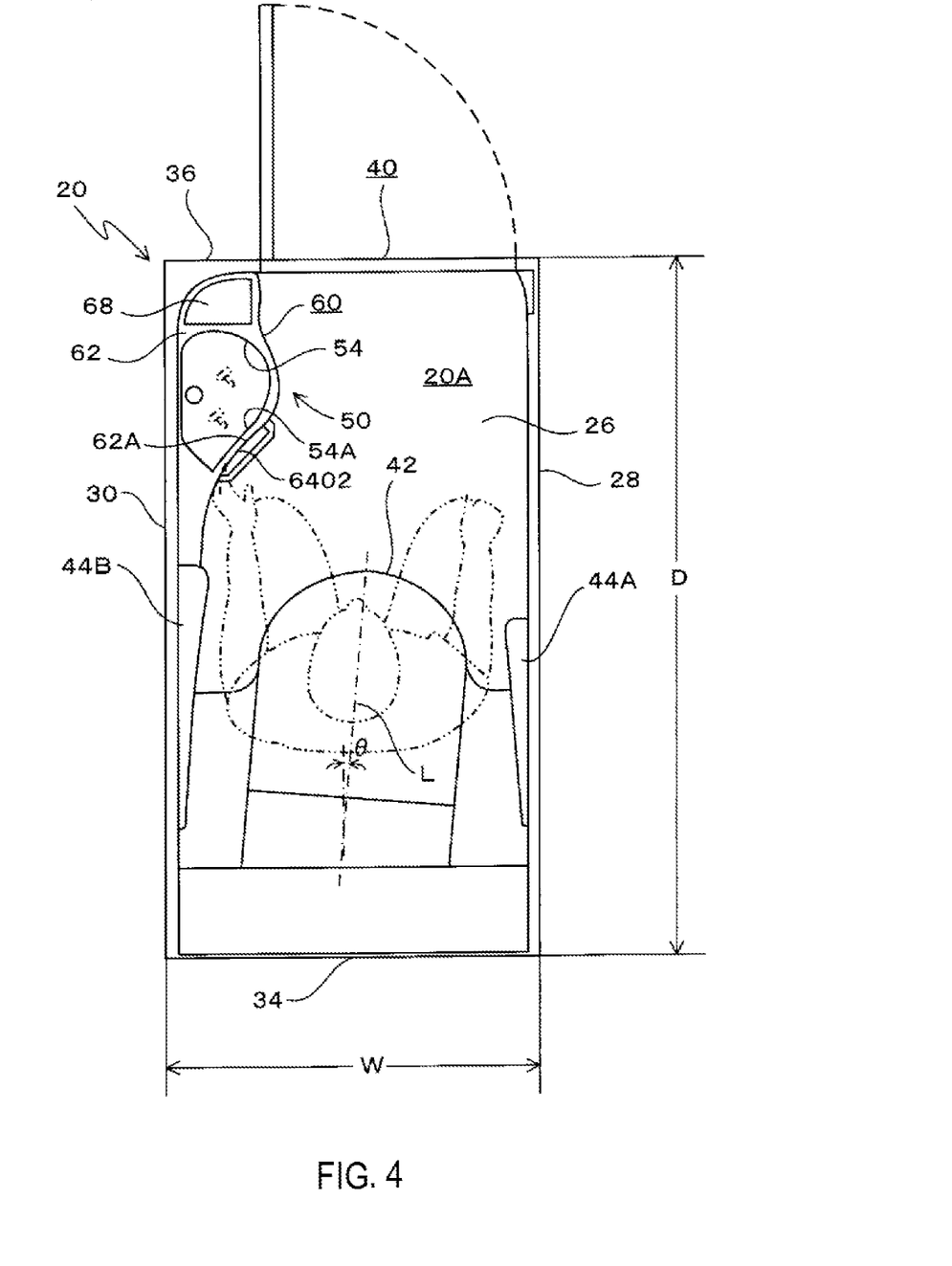
FIG. 4 is a schematic view depicting the relationship between the knees of a user seated on a toilet seat and a bottom compartment.

As depicted in FIGS. 3-4, the edge part of the bowl 54 positioned on the first side wall 28 side has a sloped part 54A that gets closer to the second side wall 30 in which the wash basin 50 is provided as it approaches the rear wall 34 from a middle location 52 in the lengthwise direction of the bowl 54.

The edge part of the top plate 62 positioned on the first side wall 28 side has a sloped part 62A that matches the sloped part 54A of the bowl 54, and gets closer to the second side wall 30 in which the wash basin 50 is provided as it approaches the rear wall 34 from a location corresponding to a middle location 52 in the lengthwise direction of the bowl 54.

The bottom decorative panel 64 has a sloped surface 6502 that matches the sloped part 62A of the bowl 54, and gets closer to the second side wall 30 in which the wash basin 50 is provided as it approaches the rear wall 34 from a location corresponding to a middle location 52 in the lengthwise direction of the bowl 54. This sloped surface 6402 is a surface 6402 facing the toilet 42.

A toilet paper holder 66 holding toilet paper is provided on the surface 6402 facing the toilet 42 side of the bottom decorative panel 64, and a trash chute 68 is provided at a location on the top plate 62 between the front wall 36 and the bowl 54.

Figure 6:
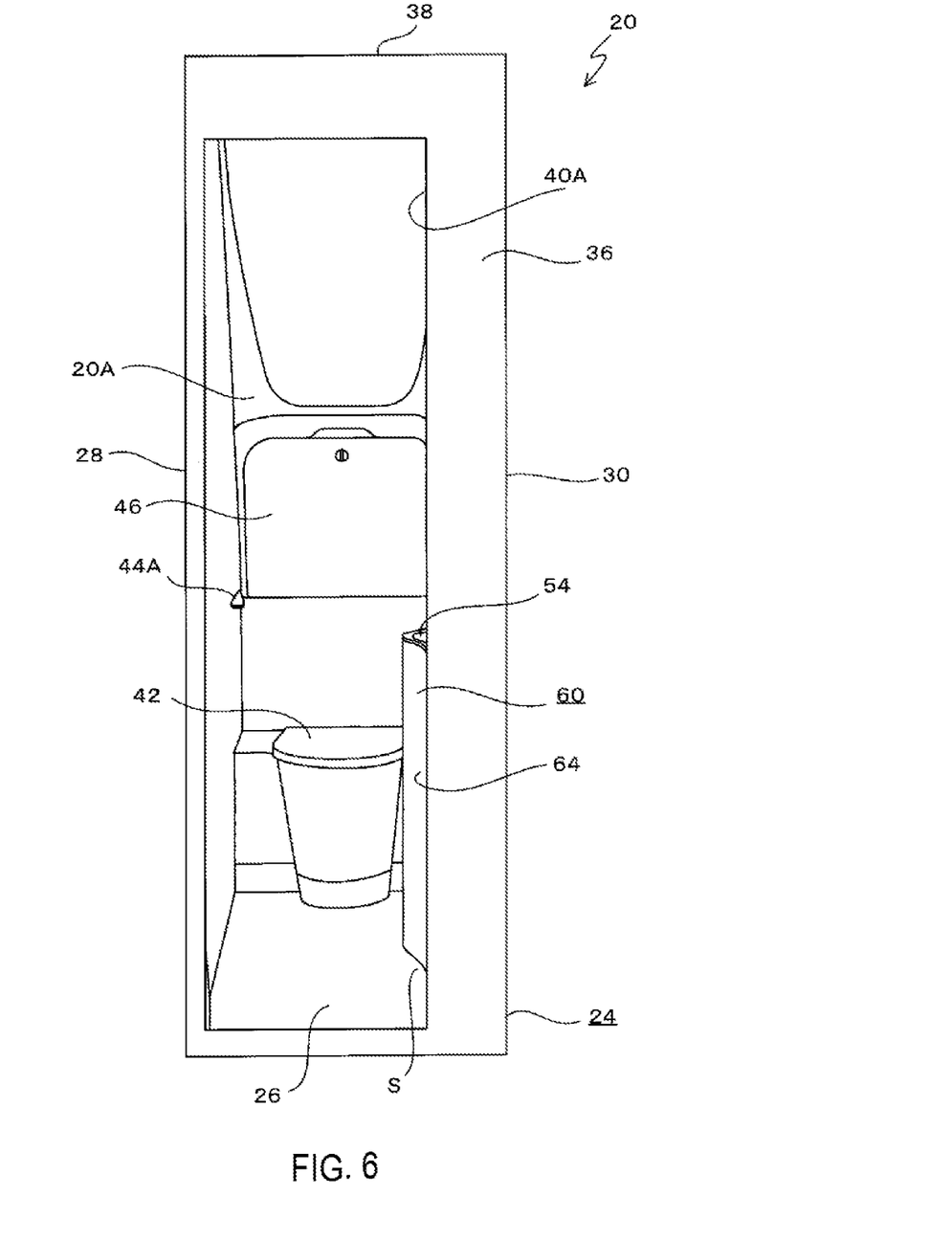
FIG. 6 is a front view of an aircraft lavatory unit with a door of a doorway removed.

Furthermore, as depicted in FIGS. 6, 7 and 8, when an approximately 100 mm space S is provided between the bottom compartment 60 and the bottom wall 26, and the bottom end of the bottom compartment 60 does not reach the bottom wall 26, the tips of feet can be inserted into this space S, and thus the bottom compartment 60 is unlikely to interfere when using the bowl 54 or when seated on the toilet seat 4202.

As depicted in FIG. 5, a trash receptacle 74, containing a trash can 70 and a fire extinguisher 72, is provided in the bottom storage space 60A.

The trash can 70 is housed within the bottom storage space 60A, and receives trash deposited from the trash chute 68.

The fire extinguisher 72 sprays a fire-extinguishing agent from the spray nozzle into the trash can 70 when a set temperature is reached or exceeded. A conventionally known inert gas, such as chlorofluorocarbon gas or halon gas, can be used as the fire-extinguishing agent, and a commercially available product can be used for the fire extinguisher 72.

Placement and removal of the trash can 70 from the bottom storage space 60A is done from an opening provided on the bottom decorative panel 64, the front wall 36 or the second side wall 30 not depicted in drawings. This opening is sealed with a cover.

Thus, by providing a bottom storage space 60A below the bowl 54, the trash receptacle 74 can be disposed using the space below the bowl 54, which is advantageous in effectively using the narrow space within the lavatory 20A.

Then, as depicted in FIGS. 3 and 4, the toilet 42 is disposed inclined at an angle θ relative to the second side wall 30 in which the wash basin 50 is provided, so that the center line L passing through the center of the toilet 42 in the widthwise direction is farther from the second side wall 30 as it gets closer to the front wall 36 side relative to the second side wall 30. This θ may be within a range of 3 to 5 degrees, for example. The center line L, passing through the center of the toilet 42 in the widthwise direction, and an imaginary line C, passing through a center of a width W of the aircraft lavatory unit at ½ W and extending in a depth direction of the aircraft lavatory unit, intersect on an inside of a contour of the toilet 42 as viewed in plan view.

In addition, as depicted by the imaginary line in FIG. 3, the top compartment 76 where lavatory toiletries are stored is provided extending to the ceiling wall 38 from a location some distance above the bowl 54 and top plate 62, so that it is on the inside of the contour of the bottom compartment 60 when seen in plan view.

The top compartment 76 is constituted by a bottom plate 80 opposing the bowl 54 and the top plate 62, and a top decorative panel 82 above the bottom plate 80 partitioning the top storage space 76A between the second side wall 30 and front wall 36.

In the present embodiment, paper towels and tissue paper are stored as lavatory toiletries in locations in the top storage space 76A on the rear wall 34 side, and dispensing openings 84 thereof are provided at locations on the top decorative panel 82 facing the rear wall 34 side.

The faucet 52A and liquid soap dispenser 52B are provided on the bottom plate 80, and the faucet switch 56A and the liquid soap dispenser switch 56B are provided on the bottom part of the top decorative panel 82.

Next, the operational advantage of the present embodiment will be explained.

If a bowl 54 is provided on the first side wall 28 or second side wall 30 protruding into the lavatory 20A, there will be no space below the bowl 54 for a person to step into. Thus, providing a bottom compartment 60 below the bowl 54 is advantageous in effectively using the narrow space within the lavatory 20A.

On one hand, if a bottom compartment 60 is provided below the bowl 54, the bottom decorative panel 64 constituting the bottom decorative panel 64 will be greater than the height of the knees of a person seated on the toilet seat 4202, so if the bottom compartment 60 and toilet 42 are close to each other in the widthwise W or depth D direction of the aircraft lavatory unit 20, the knees of a person seated on the toilet seat 4202 will touch the bottom decorative panel 64 at a location on the rear wall 34 side below the bowl 54, that is, the surface 6402 of the bottom compartment 64.

Consequently, if the width W of the aircraft lavatory unit 20 is enlarged and the bottom compartment 60 and toilet 42 are placed farther apart in the width W direction, or the depth D of the aircraft lavatory unit 20 is enlarged and the bottom compartment 60 and toilet 42 are placed farther apart in the depth D direction, the knees of a person seated on the toilet seat 4202 will not touch the surface 6402 of the bottom decorative panel 64, but simultaneously, the width W and depth D of the aircraft lavatory unit 20 are unfortunately enlarged.

In the present embodiment, as depicted in FIG. 4, by disposing the toilet 42 at an angle θ relative to the second side wall 30 in which the wash basin 50 is provided, so that the center line L passing through the center of the toilet 42 in the widthwise direction is farther from the second side wall 30 as it gets closer to the front wall 36 side relative to the second side wall 30, knees touching the surface 6402 of the bottom decorative panel 64 is avoided, even when a person tall in height is seated on the toilet seat 4202.

Consequently, it is possible to bring the bottom compartment 60 and toilet 42 close together in the width W and depth D direction, and shorten both the width W and depth D of an aircraft lavatory unit 20.

Furthermore, in the present embodiment, the surface 6402 of the bottom decorative panel 64 is a sloped surface 6402 that gets closer to the second side wall 30 as it approaches the rear wall 34, which is advantageous in bringing the bottom compartment 60 and toilet 42 closer in the width W and depth D direction, and advantageous in shortening both the width W and depth D of the aircraft lavatory unit 20.

Consequently, this is advantageous in shortening the width W and depth D of an aircraft lavatory unit 20 without losing the usability of the aircraft lavatory unit 20, which is advantageous in increasing the number of seats in an aircraft.

In addition, if the bottom compartment 60 is provided below the bowl 54, when the top compartment 76 is provided extending to the ceiling wall 38 from a location some distance above the bowl 54 and top plate 62, then the compartments in which lavatory toiletries are stored are disposed concentrated in one place within the lavatory 20A, so compared to providing a separate bottom compartment 60 and top compartment 76 at different places in the width W direction of the aircraft lavatory unit 20, a larger space is ensured within the lavatory 20A, which is advantageous in raising the usability of the aircraft lavatory unit 20.

Figure 9:
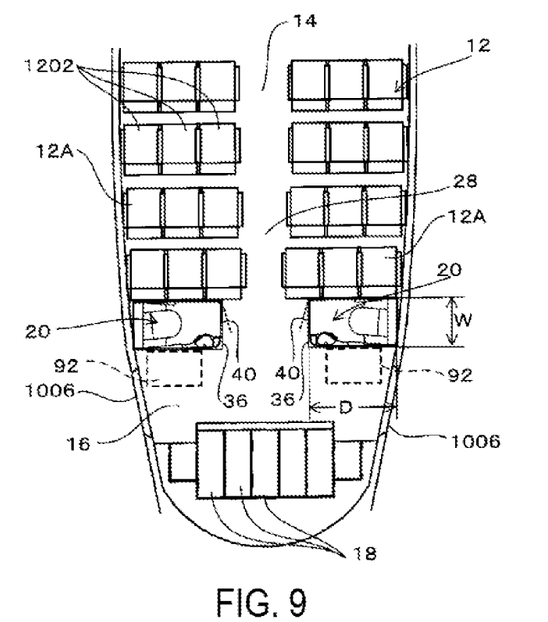
FIG. 9 is a schematic view depicting the relationship between an aircraft lavatory unit and seat groups according to an embodiment that has been installed within an aircraft.

As depicted in FIG. 9, the aircraft lavatory units 20 in the present embodiment, for example, may be disposed to the front of the latitudinal aisle 16, and adjacent to the seat rows 12A at the rear end of the seat groups 12 positioned on either side of the longitudinal aisle 14. The doorways 40 and width W direction thereof respectively oppose the longitudinal aisle 14 and face the longitudinal direction of the fuselage 10.

Furthermore, the two aircraft lavatory units 20 in FIG. 9 are in a left-to-right symmetrical arrangement with their front walls 36 in the center.

The width W and depth D of the aircraft lavatory units 20 in the present embodiment are shortened to the minimum limit. Therefore, as depicted in FIG. 10, compared to a conventional structural arrangement in which conventional aircraft lavatory units 90 are respectively disposed along the rear end of each seat group 12, by narrowing the gaps in front and in back of the seat rows 12A of each seat group 12 by several inches, 1 to 2 inches for example, it is possible to add one seat row 12A to each seat group.

Figure 10:
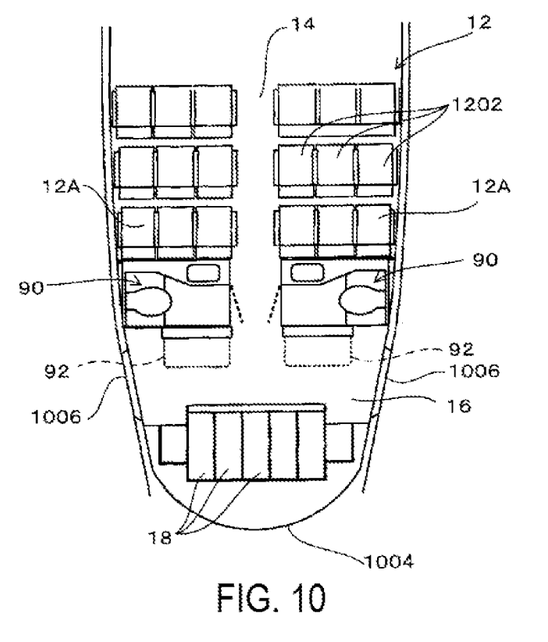
FIG. 10 is a schematic view depicting the relationship between an aircraft lavatory unit and seat groups according to a conventional example that has been installed within an aircraft.

Consequently, compared to the conventional structural arrangement in FIG. 10, an aircraft lavatory unit 20 is obtained that can provide six more seats 1202 while keeping the number of aircraft lavatory units 20 to two, which is advantageous in increasing the number of seats.

Furthermore, 92 in FIGS. 9 and 10 represents flight attendant seats.

What is claimed is:

1. A lavatory unit for an aircraft having a longitudinal aisle extending in a longitudinal direction of a fuselage of the aircraft, a latitudinal aisle extending in a widthwise direction of the fuselage and seat groups respectively provided on left and right sides of the longitudinal aisle, the lavatory unit comprising:
 a lavatory having a rectangular shape in plan view demarcated by a pair of mutually opposing side walls standing up from a bottom wall, a mutually opposing rear wall and front wall standing up from the bottom wall and a ceiling wall opposing the bottom wall;
 a toilet disposed in the lavatory in front of the rear wall with a front of the toilet facing the front wall;
 a doorway provided in the front wall; and
 a wash basin having a bowl for hand-washing provided in the lavatory;
 the bowl being disposed at a location on one of the pair of side walls between the toilet and the front wall;
 a bottom compartment including a contour matching a contour of a section of the bowl on a rear wall side as viewed in plan view being provided between the bottom wall and the bowl;
 the toilet being disposed inclined relative to the one of the pair of side walls where the wash basin is provided, so that a center line passing through a center of the toilet in a widthwise direction is farther from the one of the pair of side walls as the center line gets closer to a front wall side relative to the one of the pair of side walls;
 the center line, passing through the center of the toilet in the widthwise direction, and an imaginary line, passing through a center of a width of the lavatory unit and extending in a depth direction of the lavatory unit, intersect on an inside of a contour of the toilet as viewed in plan view; and
 the lavatory unit being disposed in front of the latitudinal aisle, and the side wall being adjacent to seat rows at a rear end of at least one of the seat groups so that the doorway in the front wall opposes the longitudinal aisle of the fuselage.

2. The lavatory unit according to claim 1, wherein the bottom compartment is constituted by a top plate positioned on a periphery of a top end of the bowl and connected to the one of the pair of side walls and the front wall, and a bottom panel erected from the bottom wall and partitioning a bottom storage space above the bottom wall and below the bowl and the top plate.

3. The lavatory unit according to claim 2, wherein the bowl has a length in a direction joining the front wall and the rear wall; and
 the bottom panel has a sloped surface that gets closer to the one of the pair of side walls in which the wash basin is provided as the sloped surface approaches the rear wall from a location corresponding to a middle location in a lengthwise direction of the bowl.

4. The lavatory unit according to claim 1, wherein a space is provided between the bottom compartment and the bottom wall for insertion of tips of feet.

5. The lavatory unit according to claim 2, wherein a trash receptacle consisting of a trash can and a fire extinguisher is provided in the bottom storage space.

6. The lavatory unit according to claim 1, wherein a top compartment in which lavatory toiletries are stored is provided extending to the ceiling wall from a location some distance above the bowl, so that the top compartment is on an inside of a contour of the bottom compartment as viewed in plan view; and
 a faucet that discharges water facing the bowl is provided on a bottom surface of the top compartment.

7. The lavatory unit according to claim 6, wherein the top compartment is constituted by a bottom plate opposing the bowl, and a top panel above the bottom plate partitioning a top storage space between the one of the pair of side walls and the front wall.

8. The lavatory unit according to claim 2, wherein a space is provided between the bottom compartment and the bottom wall for insertion of tips of feet.

9. The lavatory unit according to claim 8, wherein a trash receptacle consisting of a trash can and a fire extinguisher is provided in the bottom storage space.

10. The lavatory unit according to claim 3, wherein a space is provided between the bottom compartment and the bottom wall for insertion of tips of feet.

11. The lavatory unit according to claim 10, wherein a trash receptacle consisting of a trash can and a fire extinguisher is provided in the bottom storage space.

12. The lavatory unit according to claim 3, wherein a trash receptacle consisting of a trash can and a fire extinguisher is provided in the bottom storage space.

13. The lavatory unit according to claim 4, wherein a trash receptacle consisting of a trash can and a fire extinguisher is provided in a bottom storage space.

14. The lavatory unit according to claim 2, wherein a top compartment in which lavatory toiletries are stored is provided extending to the ceiling wall from a location some distance above the bowl, so that the top compartment is on an inside of a contour of the bottom compartment as viewed in plan view; and
a faucet that discharges water facing the bowl is provided on a bottom surface of the top compartment.

15. The lavatory unit according to claim 14, wherein the top compartment is constituted by a bottom plate opposing the bowl, and a top panel above the bottom plate partitioning a top storage space between the one of the pair of side walls and the front wall.

16. The lavatory unit according to claim 3, wherein a top compartment in which lavatory toiletries are stored is provided extending to the ceiling wall from a location some distance above the bowl, so that the top compartment is on an inside of a contour of the bottom compartment as viewed in plan view; and
a faucet that discharges water facing the bowl is provided on a bottom surface of the top compartment.

17. The lavatory unit according to claim 16, wherein the top compartment is constituted by a bottom plate opposing the bowl, and a top panel above the bottom plate partitioning a top storage space between the one of the pair of side walls and the front wall.

18. The lavatory unit according to claim 4, wherein a top compartment in which lavatory toiletries are stored is provided extending to the ceiling wall from a location some distance above the bowl, so that the top compartment is on an inside of a contour of the bottom compartment as viewed in plan view; and
a faucet that discharges water facing the bowl is provided on a bottom surface of the top compartment.

19. The lavatory unit according to claim 18, wherein the top compartment is constituted by a bottom plate opposing the bowl, and a top panel above the bottom plate partitioning a top storage space between the one of the pair of side walls and the front wall.

20. The lavatory unit according to claim 5, wherein a top compartment in which lavatory toiletries are stored is provided extending to the ceiling wall from a location some distance above the bowl, so that the top compartment is on an inside of a contour of the bottom compartment as viewed in plan view; and
a faucet that discharges water facing the bowl is provided on a bottom surface of the top compartment.

* * * * *